Dec. 13, 1932.  C. H. WILSON  1,890,923
TEST PIECE SUPPORT FOR HARDNESS TESTERS
Filed May 15, 1928   2 Sheets-Sheet 1
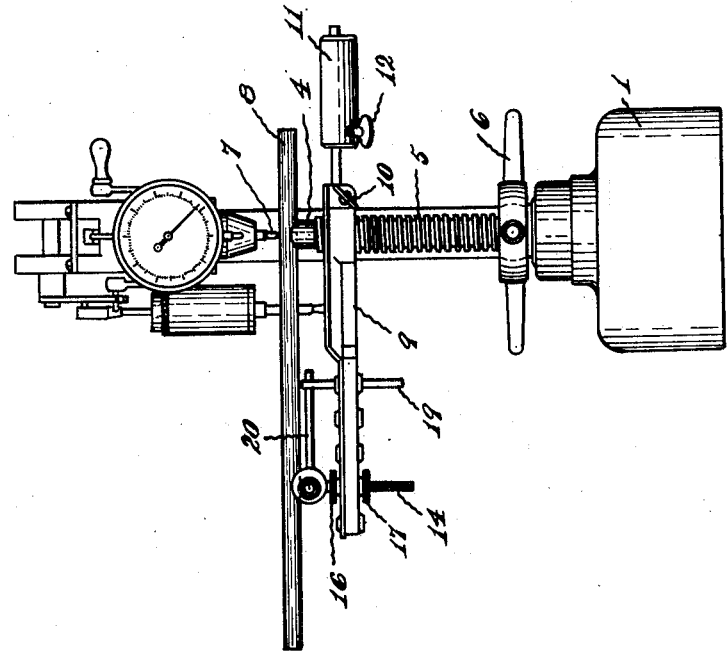
Fig.2
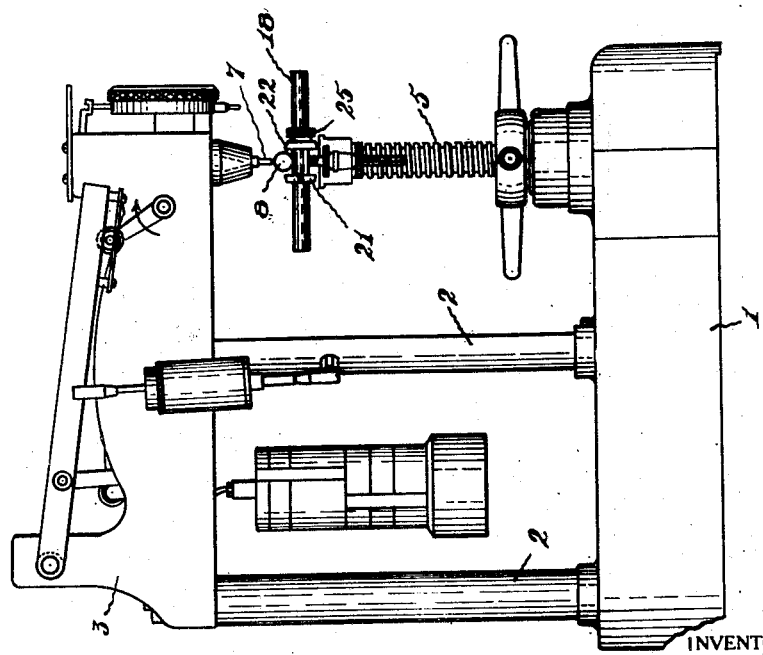
Fig.1
INVENTOR
Charles H. Wilson,
BY
 ATTORNEY

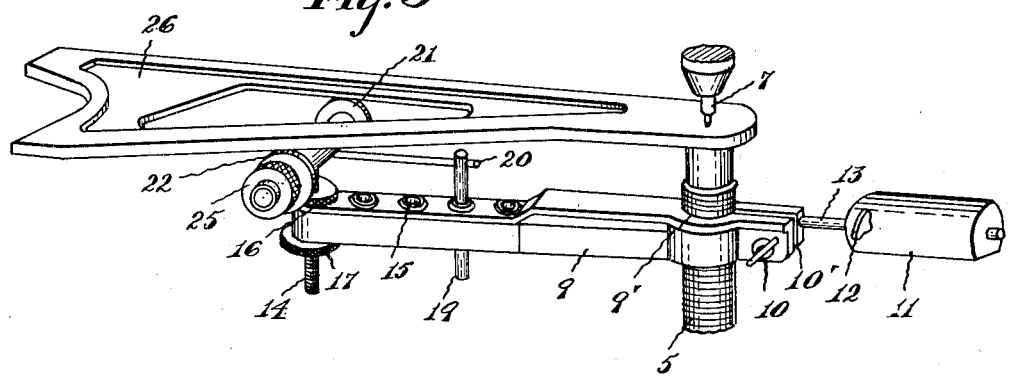
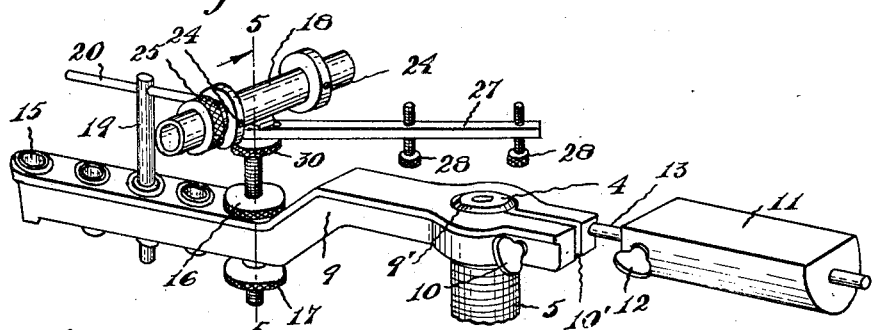
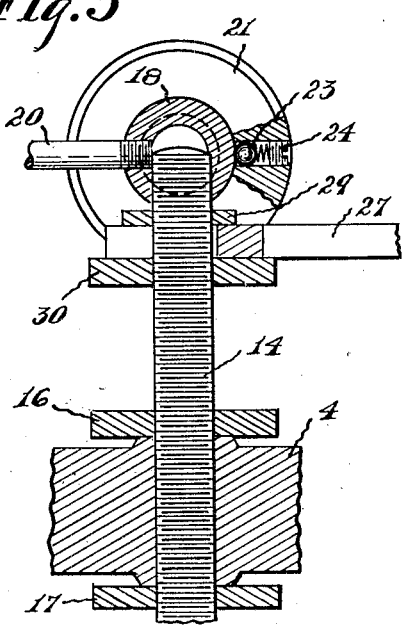
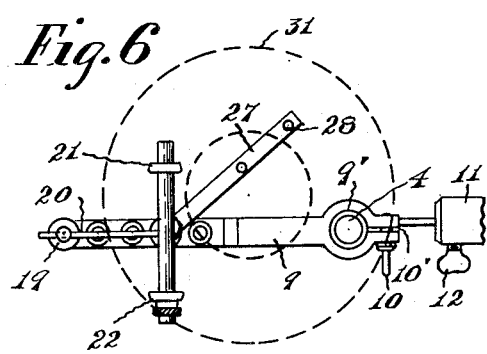

Patented Dec. 13, 1932

1,890,923

UNITED STATES PATENT OFFICE

CHARLES H. WILSON, OF PELHAM, NEW YORK, ASSIGNOR TO WILSON MECHANICAL INSTRUMENT CO. INC., OF NEW YORK, N. Y., A CORPORATION OF NEW YORK

TEST PIECE SUPPORT FOR HARDNESS TESTERS

Application filed May 15, 1928. Serial No. 277,941.

My present invention relates to supporting devices and more particularly to auxiliary work supports for use on hardness testing machines.

One of the main objects of my invention is to provide a settable work, or test piece holding support for a hardness tester which is auxiliary to the anvil of a hardness tester, and movable and cooperating therewith to support the test piece in the same operative position on the anvil throughout the application of the minor and major loads on the penetrator and piece.

Another object of the invention is to provide an auxiliary work support for hardness testers comprising a frame associated with the anvil of a tester and movable therewith, and adjustable means associated with the frame to support a test piece on the frame and anvil in the same position relative to the tester penetrator throughout the application of the minor and major loads.

Still another object of the invention is to provide an auxiliary work support for hardness testers comprising a frame adjustably associated with the anvil of a tester and movable therewith towards, and away from the tester penetrator, and adjustable supporting means associated with the frame adapted to support a test piece on the frame and anvil in the same position relative to the tester penetrator throughout the application of the minor and major loads, regardless of the shape of the test piece.

Another object is to provide in such a support, that the settable or adjustable portions thereof are easily and readily conformable to the contour of the piece being tested, and which will hold subsequent, duplicate test pieces, in a line of manufactured articles, in a firm testing position.

Another object is to provide a work support of the class herein disclosed that may be readily attached to or detached from, a hardness testing machine, as desired.

And still other objects of the invention are to improve generally the simplicity and efficiency of such devices and to provide a device or apparatus of this kind which is economical, durable and reliable to operation, and economical to manufacture.

I desire it to be understood that this invention is not limited to any specific form or arrangement of parts, except in so far as such limitations are specfied in the claims.

In hardness testing machines, wherein the depth of penetration in the material being tested, caused by a penetrator of definite shape acting under a definite load, is measured as an index of the hardness of the material being tested, as, for example, in the Rockwell Hardness Testers covered by U. S. Patents No. 1,516,207 and No. 1,516,208 and in my pending application Ser. No. 128,853, filed August 12, 1926, and also in hardness testers wherein the measurement of the load necessary to cause a certain depth of penetration into the material being tested by a penetrator of definite shape is the index of hardness, the application of load that causes the penetrator to enter the material under test is sometimes applied by moving the material to be tested against the penetrator, either for the purpose of applying the total load, or for applying some minor, fractional part of the total ultimate load.

In such hardness testers a difference in depth of penetration as small as the ten thousandth part of an inch must be indicated as a difference in hardness, so that extreme accuracy in all steps in the application of the load and in the observation of depth readings must be maintained. In such instruments it is customary to support the material being tested by some form of anvil or rest located under the penetrator, or (in the equivalent case where the penetrator is used below the work) to grip the material being tested in some vise-like chuck, where gravity is no longer available to hold the work being tested firmly against the support.

In the event that the materials being tested are small specimens, a single point of support may be sufficient, but where the piece is long, and of regular, or irregular, unsymmetrical contour, or where it must be tested very close to one edge, there is an overhanging tendency, due to the action of gravity upon the remoter, extended portions of the piece being tested, which tend to make its seating upon its anvil or rest insecure, or unstable, with the consequent result that as the unstable test piece is brought into contact with the penetrator, the force bringing the penetrator and test piece together causes some shift in the position of the test piece under test load, and distorts the load test indentation from its normal shape, size and condition, thus defeating accurate results.

The general run of manufactured articles that are tested in a hardness testing machine vary greatly in their contours, hardness, and materials, and are often of awkward conformations. Some articles, or pieces, require testing only at predetermined points, others require testing at various points and owing to the necessity of insuring an accurate seating of the testing point, or portion of the article upon the anvil, in a stable manner, and in desired test contact position for accurate test contact with the penetrator, I have devised an extension support for the overhanging, unsymmetrical or extended portions of the piece being tested, such support having the additional advantage of being adjustable, or variable settable, to enable the article or test piece to be adjustably mounted and firmly held in stable test position.

The present support is designed to support the piece so that it does not slip, roll, or in any way shift during the application and withdrawal of the minor and major loads, especially the major load. Failure to support an overhanging, unbalanced piece, may break the diamond penetrator or result in an inaccurate test.

Therefore, I have devised an adjustable support which is clamped, or otherwise mounted upon the member which supports and moves with the portion of the test specimen immediately opposite the penetrator. I find it generally most convenient to clamp this auxiliary support to the elevating screw, but it might just as well be clamped to the anvil which is a separable terminating part of the elevating screw. I provide this support with separately adjustable means of several forms and characters to permit the support to be accommodated to various sizes, shapes and lengths of pieces to be tested so as to hold them in the desired position.

The inventive features for the accomplishment of the above and other objects are shown herein in connection with an improved auxiliary work support for hardness testers which, briefly stated, includes, in combination, a frame member adapted to be attached to the anvil of a tester for movement therewith, means associated with said frame to adjust the same relative to the anvil and its elevating screw, a counterbalance associated with the frame member, a portion of said frame being offset and provided with a plurality of bores, a supporting cylinder associated with said frame, a pair of collars adjustably mounted on said cylinder, one of said collars having an eccentric shape and adapted to be rotated and locked relative to said cylinder, a threaded stud disposed in one of said bores and retained therein by a pair of knurled locking nuts, the upper end of said stud being affixed to said cylinder whereby rotation of one of said knurled nuts moves said cylinder in a direction parallel to the axis of the elevating screw, a dowel disposed in another of said bores and being slidably mounted on a cross rod rigidly affixed at one end to said cylinder, and additional supporting means adjustably associated with said stud to cooperate with said collars and anvil to support a test piece in the same position relative to said penetrator throughout the application of the minor and major loads, said additional supporting means adapted to be removed whereby a test piece may be supported on said cylinder or collars and said anvil.

With the above and other objects in view, my invention consists in the parts, improvements and combinations more fully pointed out hereinafter.

In the drawings:

Fig. 1 is a front elevation of a tester with an auxiliary work support in operative position for supporting a long, uniform shape.

Fig. 2 is an end elevation of the tester shown in Fig. 1.

Fig. 3 is a perspective view of the auxiliary work support in position for retaining a long, unsymmetrical shape.

Fig. 4 is a view similar to Fig. 3, showing a slightly modified form of support in position to retain a wide shape.

Fig. 5 is a detail section taken on line 5—5, Fig. 4, looking in the direction of the arrow.

Fig. 6 is a plan view of an arrangement as shown in Fig. 4, having a circular shaped test piece positioned thereon.

Referring now to the accompanying drawings in which like characters of reference indicate the same parts in the different views, the hardness tester comprises a metal base 1, and pillars 2 support the entire hardness testing-head mechanism. Affixed to the pillars 2 is the testing head mechanism 3 in which is assembled mechanism well-known in the art and disclosed in the patents mentioned heretofore. Therefore, since the said mechanism is well-known, I shall describe in detail only those elements necessary to a complete disclosure of my present invention. Said base, pillars and head constitute a frame.

The base 1 carries an anvil 4 of a suitable design, supported by an elevating screw 5 which is actuated by a hand wheel 6. A penetrator 7 bears upon a piece 8 to be tested, the piece resting on the anvil 4 at one end, and on an auxiliary work support, at the other end. The shape in Figs. 1 and 2 is shown as a long cylindrical one. It is understood that it may be of any uniform cross section. The anvil 4 is V-shaped to properly retain the cylindrical shape in test position.

An arm 9, which is bored at one end, as at 9' and split at 10', is clamped to the main support or elevating screw 5, by means of a clamp or wing nut 10, is movable up and down on the screw 5, and may be clamped in any desired position of elevation or orientation. A counterweight 11 is slidably mounted on a rod 13 projecting from arm 9, a wing nut 12 fixing said counterweight in approximate counter-balancing position. The arm 9 may be made of a light strong metal, such as aluminum.

The arm 9, may be offset at one end thereof, and is provided at said end with a series of bushed bores 15. A threaded stud 14 carries two nuts 16 and 17, both having knurled edges. The upper nut 16 is turned to cause elevation of the stud 14 and a hollow cylinder 18 carried thereby, and to which cylinder the stud 14 is rigidly attached. The lower knurled nut 17, acts as a lock nut, to lock the stud 14 in desired operative position.

A dowel 19, slidably mounted in one of the bores 15, slidably receives a cross rod 20, through an aperture in its upper end. The cross rod 20 is rigidly attached to the cylinder 18, thus enabling the dowel 19 to be adjusted along the length of the cross rod thereby permitting the dowel 19 to be inserted in any of the bores 15 and yet maintain a spaced, rigid relation to the cylinder 18. In like manner, the threaded stud 14 may be shifted to any of the bores by removing the lock nut 17, and so the auxiliary work support may be adjusted closer to or farther from the anvil 4.

The cylinder 18 carries two adjustable work support collars 21, 22. These collars not only turn on the cylinder, but are frictionally mounted by means of spring-pressed balls 23, the detail of which is fully disclosed, in section in Fig. 5, the friction pressure being adjusted by a screw 24. Thus the collars may be slipped to different longitudinal positions along the cylinder 18 to accommodate test pieces of varying widths and mass. One collar 22 may be made eccentric so that when rotated by a knurled extension 25 affixed to the collar, the top supporting point of the collar 22 may be placed either higher or lower than the top supporting point of collar 21. This adjustment facilitates properly supporting flat test pieces even though the cooperating support surfaces may be out of plane.

When, as in Fig. 2 an elongated test piece, 8, is uniform or cylindrical cross section, and is to be tested, one end rests in the V notch anvil 4 directly under the penetrator 7. The other end is supported at some sufficiently remote point by the cylindrical or auxiliary support 18, in which case the collars 21 and 22 are moved to such positions as will keep the piece 8 from rolling along the support 18, as shown in Figs. 1 and 2.

In Fig. 3 a long, flat piece 26 of unsymmetrical form is shown in position to be tested. Here the piece rests directly on the collars 21, 22. The collars 21—22 are adjusted to firmly support the piece to provide a stable, level seat therefor, thus to maintain the test point of the piece 26 in operative contact with the test face 4 of the anvil.

In Fig. 4, an additional piece supporting arm 27 is mounted on stud 14, between lock nuts 29 and 30, these being fully shown in section, in Fig. 5, and the nuts 29 and 30 permit of positioning the arm 27, as desired. The nut 29 abuts the cylinder 18. Adjustable support screws 28, each having a knurled head are mounted on the other end, of the arm 27 in spaced relation. It will be noted that the bushed portion of the arm 9, in this modification, is of a deeper offset than that shown in Figs. 1–3 inclusive. Otherwise, the auxiliary work support in Fig. 4 is exactly the same as in the first three figures. The auxiliary piece supporting arm 27 is readily detached and removed from the assembly shown in Figs. 4 and 5.

In Fig. 6, a bored circular test piece 31, of disc-like form, (shown in dotted lines) rests on the collars 21, 22 and one of the auxiliary support screws 28. In the event that the disc is without a central bore and is solid throughout, then both auxiliary support screws 28 would function to engage the test piece.

In using this work support, the wing nut 10 which clamps the arm 9 to the elevating screw 5 of the tester is loosened and the arm 9 is released and raised or lowered to bring it to approximately its proper relative test piece supporting position. This preliminary coarse adjustment is made when the work to be tested is on the auxiliary support.

Then the wing screw 10 is tightened, clamping support 9 to the member 5 and the fine adjustment comprising the various screw supports are operated. Only approximate counterbalancing is necessary.

If round work is to be supported, it will rest directly on the horizontal tubular cylinder 18, Figs. 1 and 2. This will be adjusted by turning the upper knurled nut 16 until the work lies squarely upon the V anvil. The two collars 21, 22 on the cylinder 18 will prevent the work from rolling, but they are not brought so close together that they bind or touch the work. This precaution permits the V shaped anvil to control the location of the test piece, in firm contact therewith, thereby obviating any tendency of a shift as the test load is applied.

In testing flat pieces which may be slightly warped, or of unsymmetrical contour, the piece is levelled by resting it on the top of the two collars, and by turning the eccentric collar 22 a three point support is made by these two collars and the flat anvil 4, as shown in Fig. 3. It is important that care be taken in making this adjustment to see that the piece rests squarely on the flat anvil and not merely on one edge of it. To accomplish this, the operator must watch for any light between the piece being tested and the flat anvil. By turning the upper knurled nut 16, the piece and support can be adjusted until the light space disappears.

It should be noted that the two collars 21 and 22 slide and turn on the cylinder 18 with easy but firm frictional grip. If extremely irregular shapes are to be tested, collars of circular, eccentric or other diameters can be used. Obviously as shown in Figs. 4, 5 and 6, any number of simple accessory supporting pieces for attachment direct to the arm 9 will suggest themselves to the skilled mechanic and are within the scope of my invention.

This support permits of universal adjustment till the piece being tested rests solidly and firmly upon the anvil of the tester. Then as the handwheel 6 is turned to carry the piece up against the penetrator 7 for contact and for application of the minor load, the anvil, the piece to be tested and the support are all elevated together and in undisturbed and test-seated relation to each other. Thus, the previously accomplished good seating of the piece to be tested is not disturbed. In this way an entire series of similar pieces may be tested with a minimum of effort on the part of the operator and a maximum speed. Should it be necessary to change to a piece of different shape, the auxiliary work support can be quickly adjusted to meet the new conditions.

The embodiments illustrated are shown by way of preference only. The foregoing detailed description has been given for clearness of understanding. Hence no unnecessary limitation should be understood. The appended claims should be construed as permissible in view of the prior art since many and various changes may be made without departing from the scope of the invention as defined in the broader claims.

Having thus described my invention what I claim is:

1. The combination with a hardness tester of the class described including an anvil, and a test load means, of a test-piece support means on said anvil and laterally projecting from said anvil and including means on said support for adjusting a test-piece to test load contact with said anvil, and means for adjusting said anvil.

2. The combination with a hardness tester of the class described, including an anvil and a test load means, of an adjustable test-piece support laterally projecting from said anvil, and including means on said anvil for adjusting the support and means for adjusting the anvil.

3. The combination with a hardness tester of the class described, including an anvil and a test load means, of an adjustable test-piece support extending from said anvil, means integral with said anvil and adjustable means on said support for adjusting a test-piece to test load contact with said anvil, and means for adjusting said anvil.

4. The combination with a hardness tester of the class described, including an anvil, of an adjustable test-piece support means on said anvil and laterally projecting from said anvil, and including means on said support for adjusting a test-piece to test load contact with said anvil and a counterbalance on said support at the opposite side of the anvil from said support means.

5. The combination with a frame having upright opposed spaced members, a perforator carried by one of said members, a main work-piece support carried by the other member below the perforator, of another support carried on said first support and having therein and distant from said first support spaced openings, and an auxiliary work-piece support aligned with said main support and having a member for insertion in selected openings to vary the points of support of a work-piece.

6. In combination with the elevating screw and anvil of a hardness tester, an auxiliary work support comprising a frame, means associated with said frame to mount it in a predetermined position relative to said screw, said frame including means adjustably associated with said frame and cooperating with said anvil to support a test-piece in testing position, and adjustable means associated with said frame to counterbalance the weight of said piece on said frame.

7. In combination with a hardness tester including an elevating screw, an anvil movable therewith, and a perforator, an auxiliary test-piece support comprising a frame, means for attaching said frame to said screw for movement therewith, said frame including means associated with said frame to support a part of a test-piece on said anvil, whereby said means may retain said test piece in the same position relative to said anvil during movement of said anvil towards said perforator and during the application of said perforator.

8. An auxiliary test piece support for hardness testers which comprise an anvil support, said auxiliary support including a frame member having means whereby said member is adapted to be attached to the anvil support for movement therewith, a main support including said anvil support, a portion of said member being provided with spaced bores, supporting means associated with one of said bores and cooperating with said main support to immovably retain a test piece in testing position throughout the testing operation, and means associated with said supporting means to adjust the supporting means relative to said frame and main support to accommodate test pieces of varying characteristics.

9. An auxiliary test piece support for hardness testers comprising a frame member having means whereby said member is adapted to be adjustably affixed to a main test support of a tester for movement with said support, and including a primary support associated with said frame, means associated with said frame and cooperating with said test support to permit adjustment of the vertical position of said test support relative to said frame, secondary supports adjustably associated with said primary support, said primary and secondary supports adapted to cooperate with said test support to retain the test piece in the same testing position relative to said test support throughout the testing operation.

10. An auxiliary work support including a frame having a plurality of bores, a threaded stud, stud adjusting lock nuts associated with said stud and locking it in desired position in any of said bores, a cylindrical member rigidly affixed to said stud and movable therewith, and a plurality of collars adjustably associated with said cylindrical member.

11. An auxiliary work support, including a frame having a plurality of bores, a threaded stud, stud adjusting means associated with said stud and frame to lock the stud in desired operative position, a cylindrical member mounted on said stud and movable therewith, and work supporting means adjustably connected to said cylindrical member.

12. In combination with a hardness tester having spaced supporting structures and a perforator and a movable main support carried by said structures, said main support having thereon below said perforator an anvil for carrying part of a work-piece, an extended support for carrying part of a work-piece, the latter being elongate, said extended support including bifurcated terminals for embracing said main support, and means for clamping said terminals in the embraced position, whereby to carry a work-piece below said perforator during movement of said main support.

13. In combination with a hardness tester having a vertical movable anvil, and a support for said anvil; an auxiliary support, means for adjustably mounting said auxiliary support on and movable with said support; said auxiliary support including a laterally projecting arm, an oppositely projecting adjustable counterweight, and interchangeable devices on said arm for supporting and adjusting test pieces thereon in proper position for hardness testing.

14. In a hardness tester comprising a penetrator, and supporting means for the perforator including a base, the combination with an adjustable support, which latter is carried on said base, said last mentioned support having thereon an anvil below said penetrator, of another support mounted on said adjustable support and including an elongate portion, an auxiliary support mounted on said portion and disposed distant from and aligned with said anvil, whereby to carry on the latter and on said auxiliary support an elongate work-piece, and means for adjusting said adjustable support with its mountings to move a work-piece relative to said penetrator.

Signed at New York in the county of Bronx and State of New York this 9th day of May A. D. 1928.

CHARLES H. WILSON.